No. 679,292. Patented July 30, 1901.
W. BUTTLER.
APPARATUS FOR THE MANUFACTURE OF SHEET GLASS.
(Application filed Apr. 17, 1900.)
(No Model.)
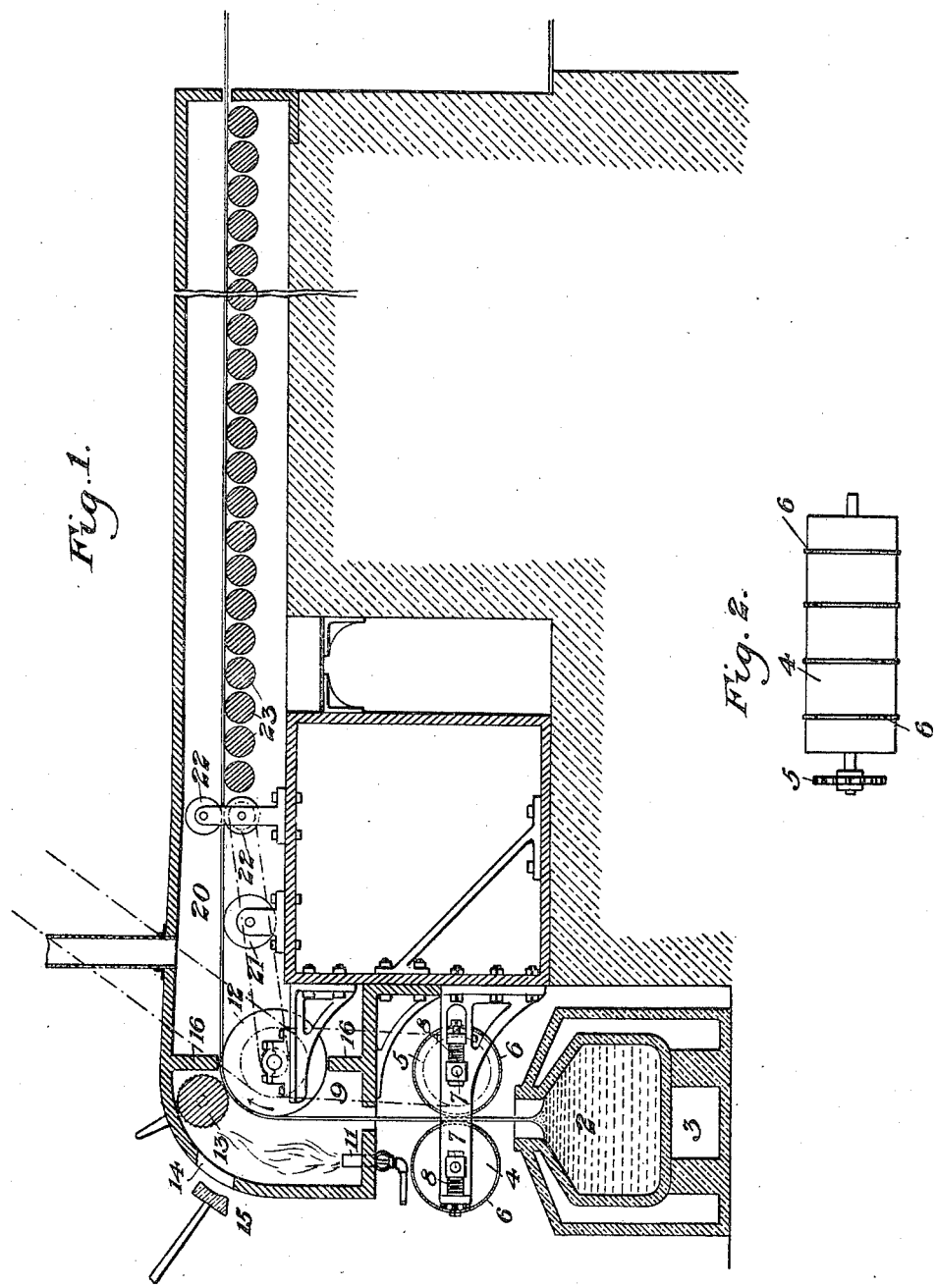
WITNESSES
INVENTOR
William Buttler
by James R. Bakewell
his attorney

UNITED STATES PATENT OFFICE.

WILLIAM BUTTLER, OF REDKEY, INDIANA.

APPARATUS FOR THE MANUFACTURE OF SHEET-GLASS.

SPECIFICATION forming part of Letters Patent No. 679,292, dated July 30, 1901.

Application filed April 17, 1900. Serial No. 13,208. (No model.)

*To all whom it may concern:*

Be it known that I, WILLIAM BUTTLER, of Redkey, in the county of Jay and State of Indiana, have invented a new and useful Improvement in Apparatus for the Manufacture of Sheet-Glass, of which the following is a full, clear, and exact description.

My invention relates to an improvement in apparatus for the manufacture of sheet-glass; and it consists in a receptacle for containing the glass in a molten condition, devices for drawing a sheet of glass upwardly from the receptacle, a heating-chamber in which the sheet of glass is reheated and softened and flattened, and devices for conducting the sheet of glass from the heating-chamber to the leer, as is hereinafter more fully described.

I will now describe my invention, so that others skilled in the art to which it appertains may build and use the same, reference being had to the accompanying drawings, forming part of this specification, in which—

Figure 1 is a longitudinal vertical sectional view of my improved apparatus, and Fig. 2 is a detached view of one of the feed-rolls.

Like numerals of reference indicate like parts wherever they occur.

In the drawings, 2 represents a tank arranged in a suitable furnace 3, in which tank the glass is kept in a molten condition. The mouth of this tank should be at least as long as the width of the sheet of glass to be drawn therefrom. Situate directly above the mouth of the tank is a pair of feed-rolls 4, the construction of which is more clearly shown by Fig. 2, which feed-rolls are driven by sprocket-wheels 5, and the face of the rolls is provided with belts 6 of asbestos, which will bind upon the glass without scratching or marring the same. These rolls are mounted in movable bearings 7, and are held in position by the springs 8, which affords a yielding pressure on the glass and allows the rolls to give should a lump in the glass pass between the same. Above the rolls 4 is a heating-chamber 9, having an opening 10 directly above the meeting faces of the rolls 4, and one or more burners 11 or other heating device. Within the heating-chamber 9 is a flattening-roll 12, above which is a flattening-roll 13, which is mounted on movable bearings. The face of this roll 13 may be figured to form a figured, rough, or ondoyant surface on the glass. Opposite the meeting faces of these rolls is an opening 14 in the wall of the heating-chamber, through which a flattening-block 15 may be inserted. Above and below the flattening-roll 12 is a partition 16, which separates the heating-chamber 9 from the leer 20, whereby the heat is retained in the heating-chamber, and the flattening-roll is half in the heating-chamber and half in the cooler leer. Inside of the leer is a supporting-roll 21 and feed-rolls 22, which are adapted to feed the glass to the carrying-rolls 23 of the leer mechanism. The feed-rolls, flattening-rolls, and carrying-rolls may be driven by any suitable driving-gear. The flattening-roll 12 may be composed of a mixture of plaster-of-paris, plumbago, and gas-carbon or of clay or other refractory material.

The operation of my improved apparatus is as follows: A bait of the length of the width of the sheet of glass to be produced is suspended and dropped into the mouth of the tank 2, and it is then drawn out of the mouth of the tank, followed by the adhering sheet of glass, which is passed between the feed-rolls 4. As the glass is fed upwardly by the rolls 4 a continuous sheet of glass is drawn from the tank, which sheet retains its shape and form through the cooling of the glass as it passes to and from the rolls. After passing the feed-rolls 4 the sheet of glass enters the chamber 9, where it is subjected to the heat produced by the burner 11, and its temperature is raised, so as to bring the sheet to a red heat, which restores it to its semiplastic condition—that is, to a condition of plasticity that will enable the glass to be flattened on the flattening-roll 12. As the sheet of glass reaches the roll 12 it may be flattened by a flattening-block 15 and guided between the rolls 12 and 13, the roll 13 having a plain flattening-face where smooth glass is desired or a rough face where it is desired to produce rough or figured glass. The rolls 12 and 13 not only flatten or figure the sheet of glass in the heating-chamber 9, but also bend the sheet of glass, and thereby change the course of travel of the sheet, whereby the continuous sheet of glass is caused to pass horizontally into the annealing-leer 20. This operation, by which the glass is drawn into a sheet, is reheated and flattened and is passed into the leer without the necessity of cutting or handling the glass either in its plastic or brittle condition, may be continuous, and as it may be conducted by apparatus other than is herein described and also by the manipulation of skilled workmen it forms the subject-matter of a separate application, Serial No. 740,389, filed December 15, 1899. The advantages of my improved apparatus will be apparent to those skilled in the art. The operation is continuous and without unnecessary handling, cutting, or transportation of the glass.

Having thus described my invention, what I claim, and desire to secure by Letters Patent, is—

1. In apparatus for the manufacture of sheet-glass by a continuous operation, the combination of a tank for containing the molten glass, a device for drawing upwardly a sheet of glass from the tank, a heating-chamber in which the sheet thus formed is reheated and softened, said heating-chamber being separated from the tank by a space containing a cooler atmosphere, and flattening devices contained in the heating-chamber, substantially as described.

2. In apparatus for the manufacture of sheet-glass by a continuous operation, the combination of a tank for containing the molten glass, a device for drawing upwardly a sheet of glass from the tank, a heating-chamber situate above the tank, in which heating-chamber the sheet of glass so formed is reheated so as to raise the temperature of the glass above the temperature at which it enters the heating-chamber, flattening devices, and a leer communicating with the heating-chamber, substantially as described.

3. In apparatus for the manufacture of sheet-glass by a continuous operation, the combination of a tank for containing the molten glass, feed-rolls situate above the mouth of the tank, a heating-chamber situate above the feed-rolls, in which heating-chamber the sheet of glass coming from the feed-rolls is reheated so as to raise the temperature of the glass above the temperature at which it enters the heating-chamber, a flattening-roll situate within the heating-chamber, and a leer communicating with the heating-chamber, substantially as described.

In testimony whereof I have hereunto set my hand.

WILLIAM BUTTLER.

Witnesses:
WILLIAM A. DRAGOO,
EDWARD ABRAHAM.